J. REGAL, Jr.
TRAP.
APPLICATION FILED DEC. 29, 1916. RENEWED OCT. 29, 1917.
1,253,886. Patented Jan. 15, 1918.
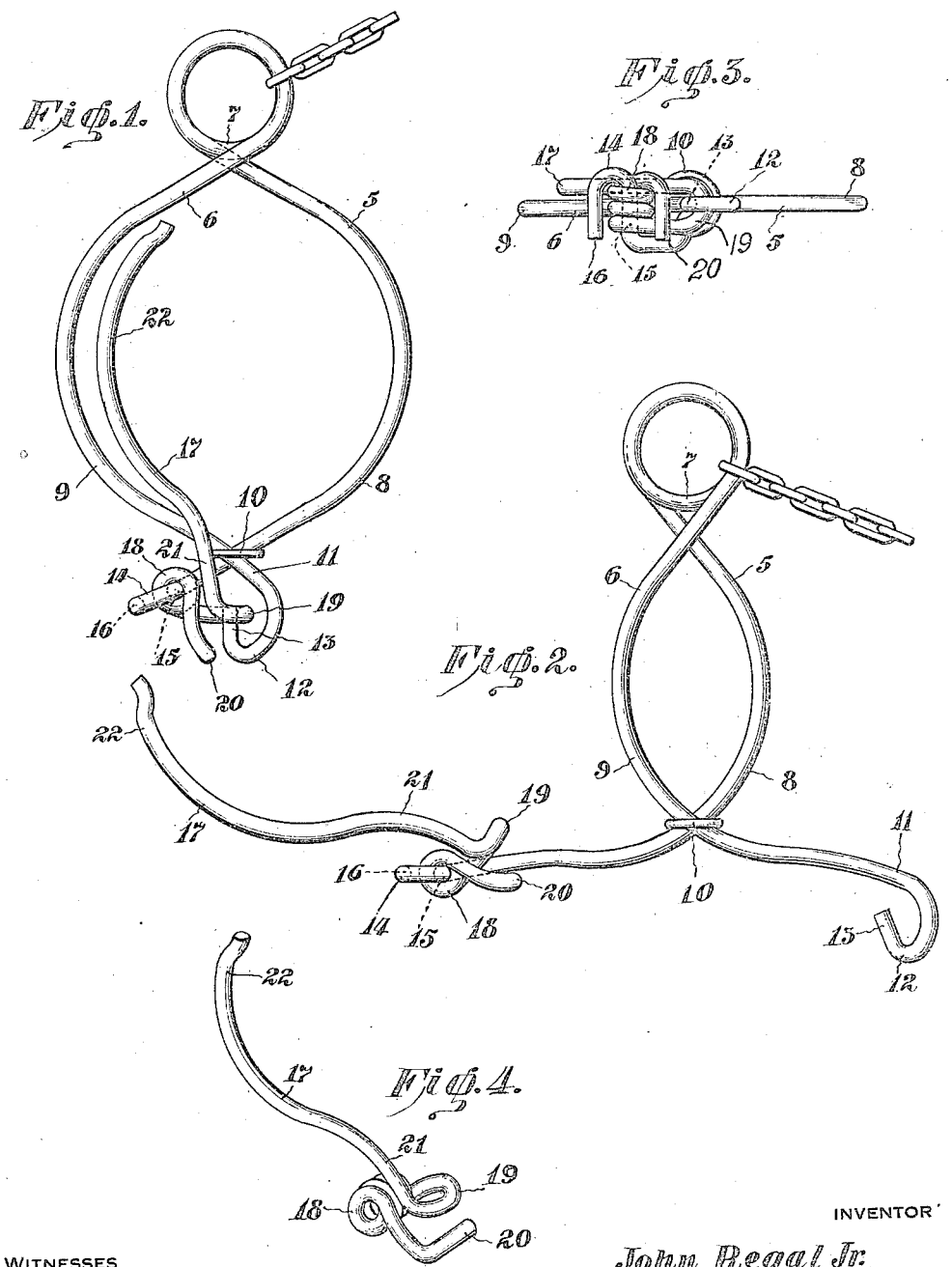
WITNESSES
INVENTOR
John Regal Jr.
BY Victor J. Evans
ATTORNEY

UNITED STATES PATENT OFFICE.

JOHN REGAL, JR., OF LUNDGREN, MINNESOTA.

TRAP.

1,253,886.  Specification of Letters Patent.  Patented Jan. 15, 1918.

Application filed December 29, 1916, Serial No. 139,599. Renewed October 29, 1917. Serial No. 199,204.

*To all whom it may concern:*

Be it known that I, JOHN REGAL, Jr., a citizen of the United States, residing at Lundgren, in the county of Koochiching and State of Minnesota, have invented new and useful Improvements in Traps, of which the following is a specification.

The present invention relates to traps, contemplating more particularly an impalement trap of that type which readily kills the animal when the trap is sprung, and wherein means are employed in facilitating the setting operation of the trap without endangering the hand of the operator being caught in such trap.

An object of the invention resides in the provision of a trap of the above stated character wherein use is made of a novel type of trigger automatically moved during the opening operation of the jaws to enable an interlocking connection of the jaws with such trigger for holding the jaws in an open set position.

With the above and other objects in view, the invention consists in the novel features, details of construction and combination of parts which will hereinafter be more fully set forth, illustrated in the accompanying drawing and pointed out in the appended claims.

Figure 1 is a plan view of the trap in set position;

Fig. 2 is a plan view of the trap in closed position;

Fig. 3 is an end elevation illustrating the trap in set position; and

Fig. 4 is a perspective view of the trigger.

Referring more particularly to the accompanying drawing, in which like characters of reference refer to corresponding parts in the several views, 5 denotes the trap generally constructed from a single piece of metal 6 bent at its intermediate portion to provide a coil 7. The coil 7 terminates in a pair of substantially semi-cylindrical jaws 8 and 9 respectively, in which the animal is entrapped. The closing action of the jaws is greatly facilitated through the employment of a slidable ring 10 which embraces the overlapping forward ends 11 of said jaws. The free terminal of the jaw 9 is bent to provide a substantially U-shaped hooked end 12 including a finger 13 disposed in a longitudinal plane to the plane of the jaws. The free extremity of the jaw 8 of the trap is bent to provide an inverted U-shaped bearing 14 constituting an inner limb 15 and an outer limb 16.

I propose to facilitate the operation of the setting of traps of this type, due to the provision of a novel type of trigger, used in association with improved means for throwing the trigger to a set position. To this end, the trigger is denoted by the character 17 and may be constructed of any suitable material, bent to provide a vertically arranged sleeve 18 which embraces the inner limb 15 of the bearing for pivotally mounting the trigger in the U-shaped bearing of the jaw 9 for a horizontal swinging movement. The lower end of the bearing sleeve 18 is bent in a lateral direction to provide a horizontally disposed keeper 19, while the opposite end of the sleeve is continued to provide an L-shaped actuating arm 20, the said arm being disposed at right angles with respect to the keeper and having the vertical portion 21 thereof obstructing the path of movement of the finger 13, thus upon the setting operation of the trap, the finger 13 first engages with the depending portion 21 of the actuating arm, which in turn rocks the body portion 22 of the trigger within the jaws 8 and 9. This operation of setting the trap, it is obvious, will at the same time open the jaws 8 and 9 and as the finger engages with the actuating arm 21, will automatically move the keeper 19 in such position as to allow the finger 13 to automatically engage therewith.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative and that such changes may be made when desired as are within the scope of the appended claims.

What is claimed as new, is:

1. A trap embodying a pair of jaws, a trigger pivotally mounted on one of said jaws, and provided with a keeper, and means carried by said trigger with which the opposite jaw engages for automatically throwing the trigger to set position and adapting the last mentioned jaw to operatively engage in the keeper of said trigger.

2. A trap of the character set forth including a pair of tensioned jaws, a trigger pivotally mounted at the extremity of one of said jaws, the extremity of the other of said jaws adapted to operatively engage with a portion of the trigger for throwing the trigger to set position.

3. A trap of the character set forth embodying a pair of yieldable jaws, the extremities of said jaws overlapping, a trigger mounted upon one of the overlapped ends of said jaws for horizontal swinging movement, and means formed on the extremity of the other overlapped end of said jaw for operating the trigger to a set position upon the opening action of said jaws.

In testimony whereof I affix my signature.

JOHN REGAL, Jr.

Copies of this patent may be obtained for five cents each, by addressing the "Commissioner of Patents, Washington, D. C."